US008341697B2

(12) United States Patent  
Ito

(10) Patent No.: US 8,341,697 B2  
(45) Date of Patent: Dec. 25, 2012

(54) IMAGE PROCESSING SYSTEM, IMAGE PROCESSING APPARATUS, AND CONTROL METHOD OF IMAGE PROCESSING APPARATUS

(75) Inventor: Chie Ito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 978 days.

(21) Appl. No.: 12/389,825

(22) Filed: Feb. 20, 2009

(65) Prior Publication Data

US 2009/0235261 A1    Sep. 17, 2009

(30) Foreign Application Priority Data

Mar. 17, 2008 (JP) ................................. 2008-067880

(51) Int. Cl.
*G06F 21/00* (2006.01)

(52) U.S. Cl. .......... 726/2; 717/100; 358/1.13; 358/1.15; 358/403; 713/185; 713/186; 726/3; 726/4; 726/26

(58) Field of Classification Search .................. 717/100; 358/1.15, 1.13, 403; 713/185, 186; 726/2–4, 726/26

See application file for complete search history.

(56) References Cited

U.S. PATENT DOCUMENTS

| 7,920,286 | B2* | 4/2011 | Utsumi ........................ 358/1.15 |
| 2006/0064741 | A1* | 3/2006 | Terao ................................. 726/4 |
| 2006/0126100 | A1* | 6/2006 | Jung ............................ 358/1.14 |
| 2006/0282782 | A1* | 12/2006 | Yamada ........................ 715/733 |
| 2007/0107042 | A1* | 5/2007 | Corona ............................ 726/2 |
| 2007/0171466 | A1* | 7/2007 | Shigeeda ..................... 358/1.15 |

FOREIGN PATENT DOCUMENTS

| JP | 2006-235757 A | 9/2006 |
| JP | 2006-295529 A | 10/2006 |

* cited by examiner

*Primary Examiner* — Brandon Hoffman  
*Assistant Examiner* — Hee Song  
(74) *Attorney, Agent, or Firm* — Rossi, Kimms & McDowell LLP

(57) ABSTRACT

An image processing system capable of enhancing the reliability of secret leakage prevention, which includes an image processing apparatus, an access control apparatus that issues authority information on each user, and a job history management apparatus that manages job histories. Authority information on a user logging in the image processing apparatus is acquired. With reference to the authority information, whether or not a job for which an execution instruction is given by the user is executable is determined. If executable, the job is executed. If the job is not executable, whether or not the job is executable on condition that a job history is transmitted to the job history management apparatus is further determined. If conditionally executable, the job is executed, and a history of the executed job is acquired and transmitted to the job history management apparatus.

7 Claims, 15 Drawing Sheets

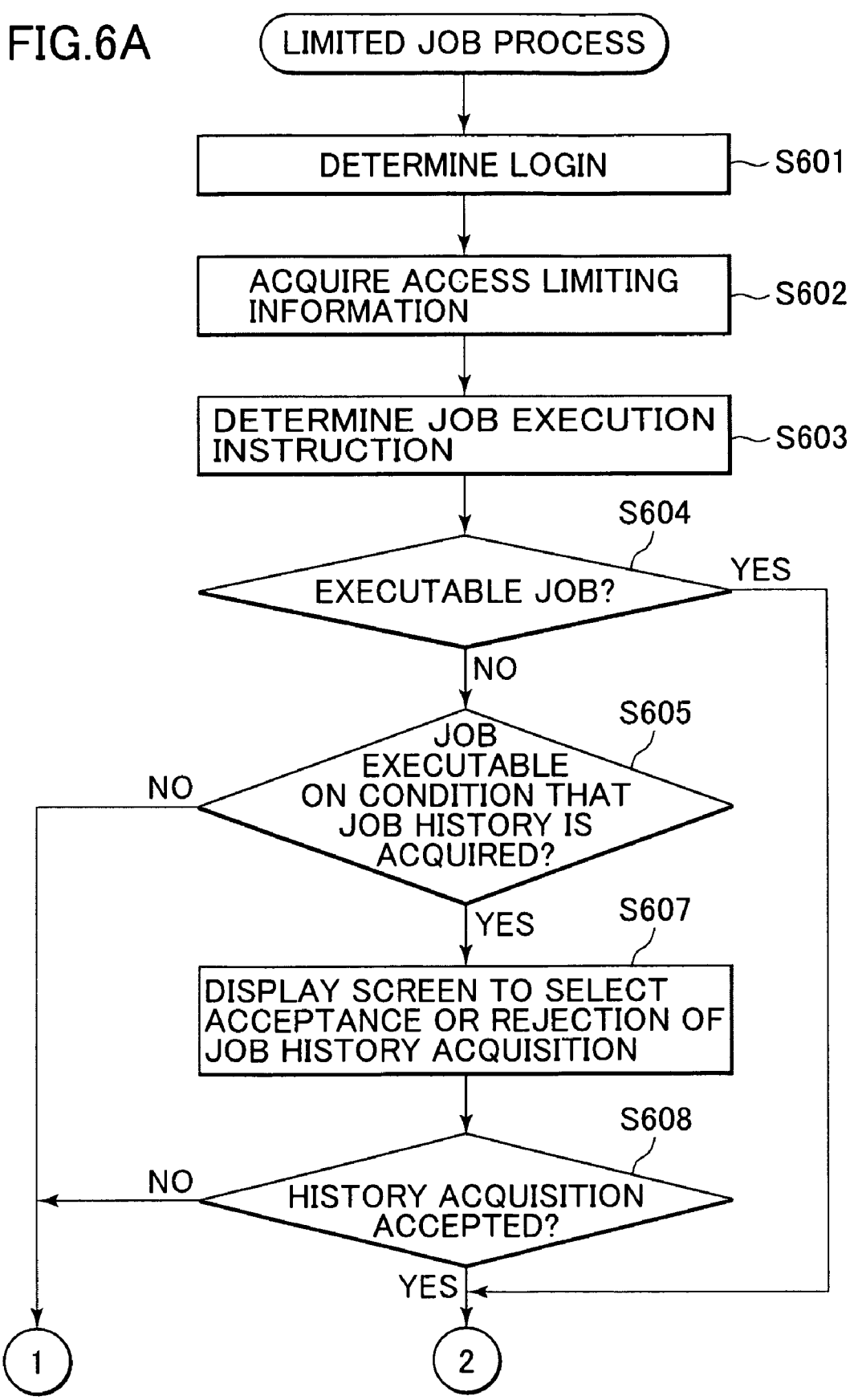

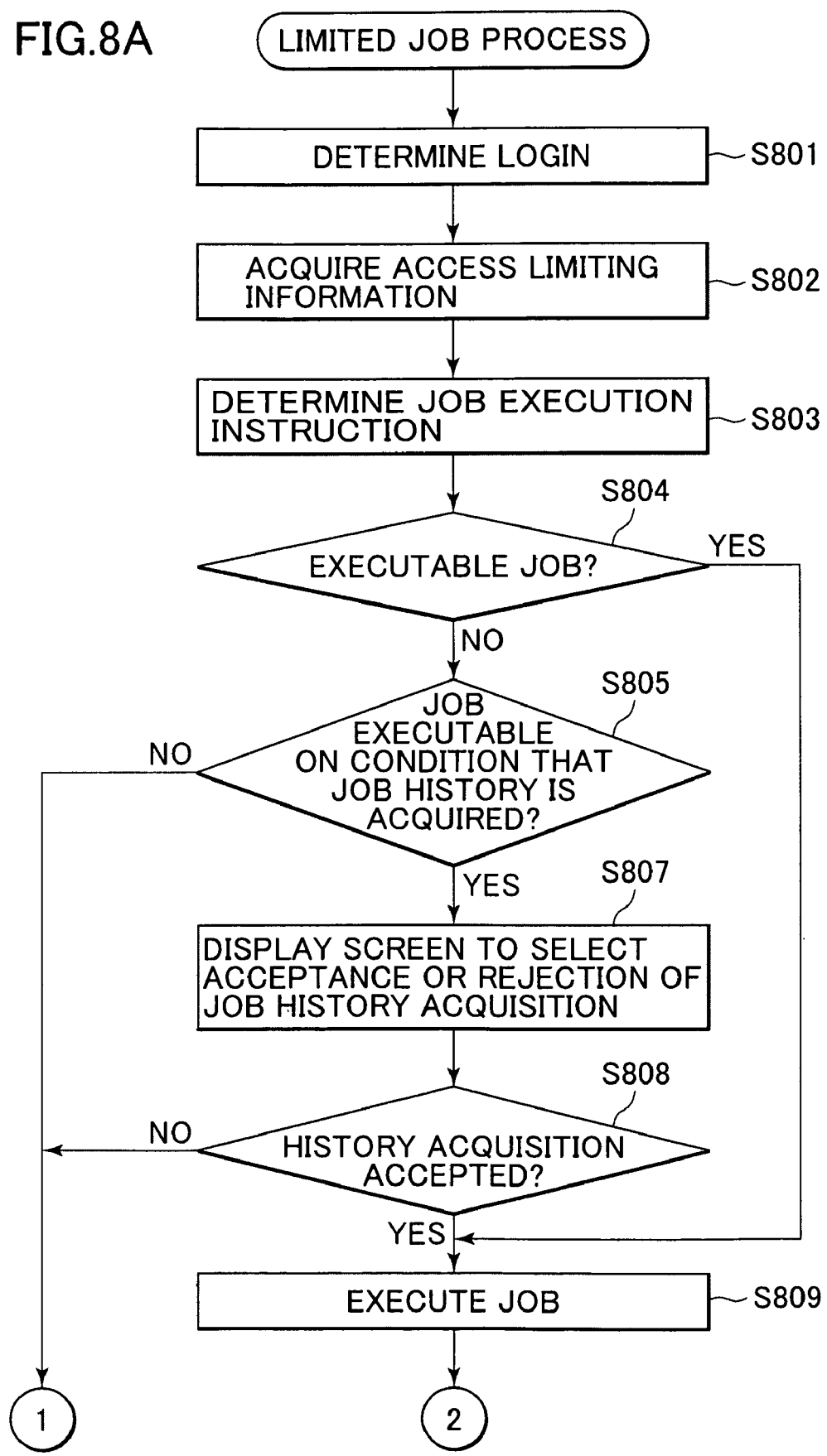

FIG.9

```
<AccessControlInfo>
 <UserInfo>
  <UserName>xxx</UserName>
  <ExtraInfo>
    <UserGroupList>
     <UserGroup>AAA</UserGroup>
     <UserGroup>CCC</UserGroup>
    </UserGroupList>
  </ExtraInfo>
  <DeviceInfo>
   <Attribute Name="ApplicationId">
    <AttributeValue Name="UsePossible">aaa</AttributeValue>
    <AttributeValue Name="UseImpossible">bbb</AttributeValue>
   </Attribute>
   <Attribute Name="ApplicationCategory">
    <AttributeValue Name="PrintCategory">Permit</AttributeValue>
    <AttributeValue Name="CopyCategory">Permit</AttributeValue>
    <AttributeValue Name="SendCategory">Deny</AttributeValue>
   </Attribute>
  </DeviceInfo>
 </UserInfo>
</AccessControlInfo>
```

FIG.10

```
<AccessControlInfo>
 <UserInfo>
   <UserName>xxx</UserName>
   <ExtraInfo>
      <UserGroupList>
        <UserGroup>AAA</UserGroup>
        <UserGroup>CCC</UserGroup>
      </UserGroupList>
   </ExtraInfo>
   <DeviceInfo>
    <Attribute Name="ApplicationId">
      <AttributeValue Name="UsePossible">aaa</AttributeValue>
      <AttributeValue Name="UseImpossible">bbb</AttributeValue>
    </Attribute>
    <Attribute Name="ApplicationCategory">
      <AttributeValue Name="PrintCategory">Permit</AttributeValue>
      <AttributeValue Name="CopyCategory">LimitedPermit</AttributeValue>
      <AttributeValue Name="SendCategory">Deny</AttributeValue>
    </Attribute>
    <Attribute Name="LimitedCondition">
      <AttributeValue Name="Requirement">GetLog</AttributeValue>
    </Attribute>
   </DeviceInfo>
 </UserInfo>
</AccessControlInfo>
```

FIG.11

```xml
<AccessControlInfo>
 <UserInfo>
  <UserName>xxx</UserName>
  <ExtraInfo>
   <UserGroupList>
    <UserGroup>AAA</UserGroup>
    <UserGroup>CCC</UserGroup>
   </UserGroupList>
   <LogInfo>
    <defaultitem>
     <item>JobType</item>
     <item>LogID</item>
     <item>UserID</item>
     <item>HostID</item>
    </defaultitem>
    <LimitedConditionSubsequent>
     <item>SectionID</item>
     <item>JobStartTime</item>
     <item>JobEndTime</item>
     <item>DeviceID</item>
     <item>PageCount</item>
    </LimitedConditionSubsequent>
   </LogInfo>
  </ExtraInfo>
  <DeviceInfo>
   <Attribute Name="ApplicationId">
    <AttributeValue Name="UsePossible">aaa</AttributeValue>
    <AttributeValue Name="UseImpossible">bbb</AttributeValue>
   </Attribute>
   <Attribute Name="ApplicationCategory">
    <AttributeValue Name="PrintCategory">Permit</AttributeValue>
    <AttributeValue Name="CopyCategory">LimitedPermit</AttributeValue>
    <AttributeValue Name="SendCategory">Deny</AttributeValue>
   </Attribute>
   <Attribute Name="LimitedCondition">
    <AttributeValue Name="Requirement">GetLog</AttributeValue>
   </Attribute>
  </DeviceInfo>
 </UserInfo>
</AccessControlInfo>
```

FIG.12

```
<?xml versions="1.0"?>
<jdd:LogData xmlns:jdd=http://xxx/xxx/xx>
  <jdd:paramaeter>
    <jdd:JobData JobType="Print"
      LogID="0001"
      UserID="1111"
      HostID="0011"
    </jdd:JobData>
  </jdd:parameter>
</jdd:LogData>
```

FIG.13

```
<?xml versions="1.0"?>
<jdd:LogData xmlns:jdd=http://xxx/xxx/xx>
  <jdd:paramaeter>
    <jdd:JobData JobType="Copy"
      LogID="0001"
      UserID="1111"
      HostID="0011"
      SectionID="2365"
      JobStartTime="2007/08/01 15:00"
      JobEndTime="2007/08/01 15:05"
      DeviceID="000888111"
      PageCount="5"
    </jdd:JobData>
  </jdd:parameter>
</jdd:LogData>
```

IMAGE PROCESSING SYSTEM, IMAGE PROCESSING APPARATUS, AND CONTROL METHOD OF IMAGE PROCESSING APPARATUS

BACKGROUND OF THE INVENTION

1. Field of the Invention

The present invention relates to an image processing system, an image processing apparatus, and a control method of the image processing apparatus, which are characterized by access control technique.

2. Description of the Related Art

In recent years, with the increase of functionality and digitization of image processing apparatuses, information handled by image processing apparatuses have become diversified and outputs can be attained with simple operations. On the other hand, with the increase of security awareness, it has been demanded to prevent the leakage of secrets and identify the source and route of leakage upon occurrence of the same.

To prevent the leakage of secrets, there is known a job history management system that records a history of job, such as paper output and electronic data transmission, along with information on a user performing a job.

There is also known a system (access control system) that performs access control such as to permit only particular users to utilize functions of image processing apparatus, thereby preventing the leakage of secrets.

Japanese Laid-open Patent Publication No. 2006-295529 discloses a job history management system that notifies the user that user's personal information is acquired by and recorded in the system, thereby preventing unauthorized use and avoiding problems caused by the recording of personal information.

Japanese Laid-open Patent Publication No. 2006-235757 discloses an authentication function-based technique to enable a user having an equipment use authority to give a temporary authority to another user not having authority, whereby the user not having authority becomes able to use the equipment.

With the technique disclosed in Japanese Laid-open Patent Publication No. 2006-295529, the notification on history acquisition of managed documents can be carried out, but cannot be made on a job-type basis. In addition, the acquisition of job history is carried out in accordance with the settings that are uniform for all users without exception.

With the technique disclosed in Japanese Laid-open Patent Publication No. 2006-235757, there must be an authorized user having an equipment use authority, and therefore, if the authorized user is absent, a user not having authority cannot use any equipment function.

As described above, the job history management system and the access control system are common in their purpose of preventing the leakage of secrets. Nevertheless, these systems function independently of each other, and therefore efficient cooperation cannot be realized at present.

SUMMARY OF THE INVENTION

The present invention provides an image processing system, an image processing apparatus, and a control method thereof, which are capable of enhancing the reliability of secret leakage prevention.

According to a first aspect of this invention, there is provided an image processing apparatus capable of communicating with an access control apparatus that manages authority information on a function of the image processing apparatus on a per-user basis and with a job history management apparatus that manages a job history of the image processing apparatus, comprising an acquisition unit adapted to acquire authority information on a user logging in the image processing apparatus, a determination unit adapted to determine with reference to the authority information acquired by the acquisition unit, in a case where the image processing apparatus receives a user's instruction to execute a job, whether the job is executable without a history of the job being transmitted to the job history management apparatus or the job is executable on condition that the history of the job is transmitted to the job history management apparatus or the job is not executable, an execution unit adapted to execute the job except for a case where the determination unit determines that the job is not executable, and a transmission unit adapted to acquire, in response to the determination unit determining that the job is executable on condition that the history of the job is transmitted to the job history management apparatus, the history of the job executed by the execution unit and to transmit the acquired history of the job to the job history management apparatus.

According to a second aspect of this invention, there is provided an image processing system including the image processing apparatus according to the first aspect of this invention, an access control apparatus that manages authority information on a function of the image processing apparatus on a per-user basis, and a job history management apparatus that manages a job history of the image processing apparatus.

According to a third aspect of this invention, there is provided a control method of an image processing apparatus capable of communicating with an access control apparatus that manages authority information on a function of the image processing apparatus on a per-user basis and with a job history management apparatus that manages a job history of the image processing apparatus, comprising an acquisition step of acquiring authority information on a user logging in the image processing apparatus, a determination step of determining with reference to the authority information acquired in the acquisition step, in a case where the image processing apparatus receives a user's instruction to execute a job, whether the job is executable without a history of the job being transmitted to the job history management apparatus or the job is executable on condition that the history of the job is transmitted to the job history management apparatus or the job is not executable, an execution step of executing the job except for a case where it is determined in the determination step that the job is not executable, and a transmission step of acquiring, in response to the determination step determining that the job is executable on condition that the history of the job is transmitted to the job history management apparatus, the history of the job executed in the execution step and transmitting the acquired history of the job to the job history management apparatus.

According to the present invention, the reliability of secret leakage prevention can be enhanced.

Further features of the present invention will become apparent from the following description of an exemplary embodiment with reference to the attached drawings.

BRIEF DESCRIPTION OF THE DRAWINGS

FIGS. 6A and 6B are a flowchart showing a first example of the procedure of a limited job process carried out by the image processing system in FIG. 4;

FIGS. 8A and 8B are a flowchart showing a third example of the procedure of a limited job process carried out by the image processing system;

FIG. 9 is a view showing a first example of access limiting information generated by a user authentication unit in FIG. 4;

FIG. 10 is a view showing a second example of access limiting information generated by the user authentication unit;

FIG. 11 is a view showing a third example of access limiting information generated by the user authentication unit;

FIG. 12 is a view showing a first example of a history acquired by the image processing system in FIG. 4; and FIG. 13 is a view showing a second example of a history acquired by the image processing system.

DETAILED DESCRIPTION OF THE PREFERRED EMBODIMENT

The present invention will now be described in detail below with reference to the drawings showing a preferred embodiment thereof.

Figure 1:
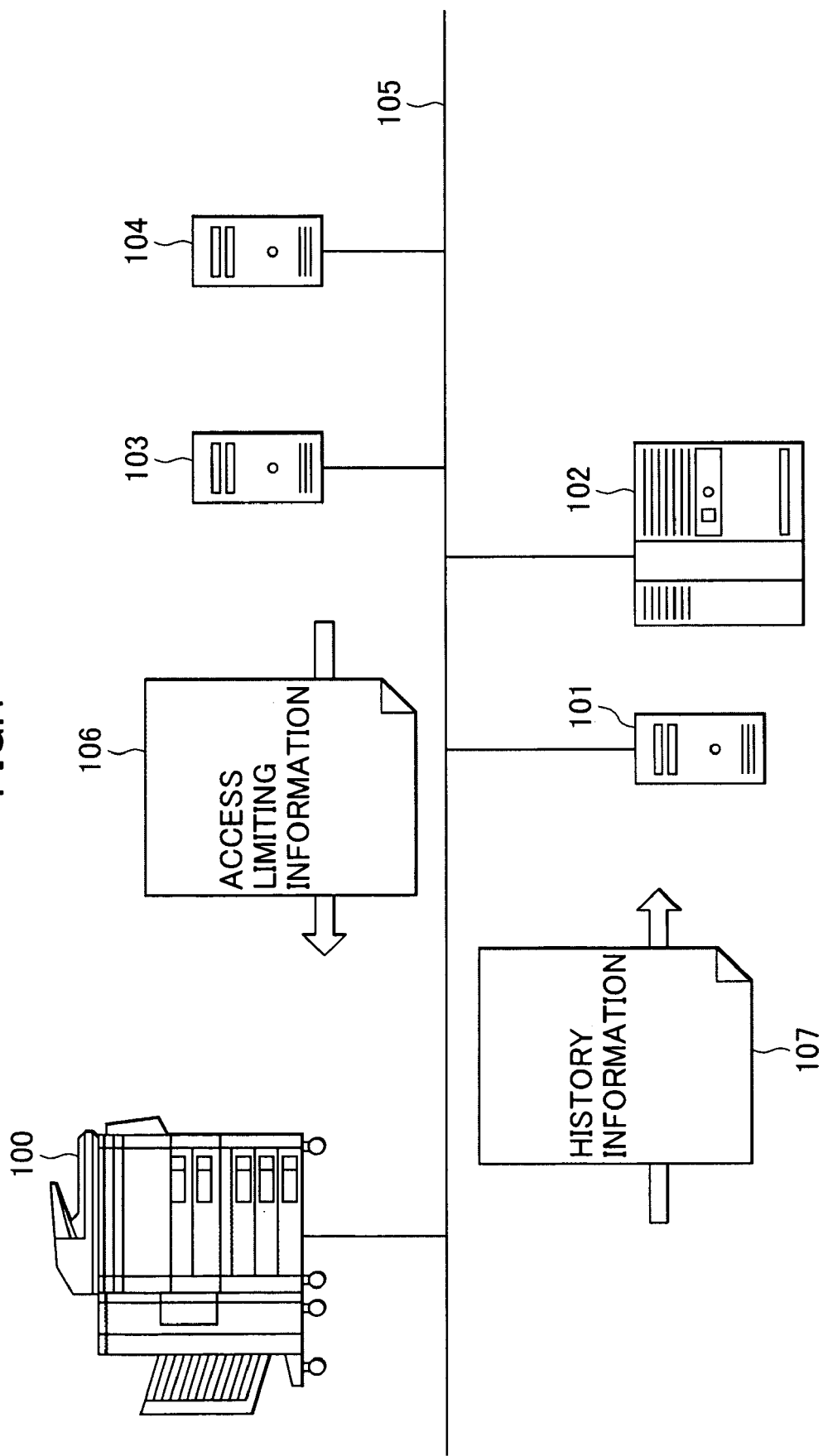
FIG. 1 is a view showing the construction of an image processing system according to one embodiment of this invention.

FIG. 1 shows the construction of an image processing system according to one embodiment of this invention.

The image processing system includes an image processing apparatus 100, a service provider 101, a data server 102, a security agent 103, and a directory server 104, which are connected to one another via a LAN 105.

Figure 4:
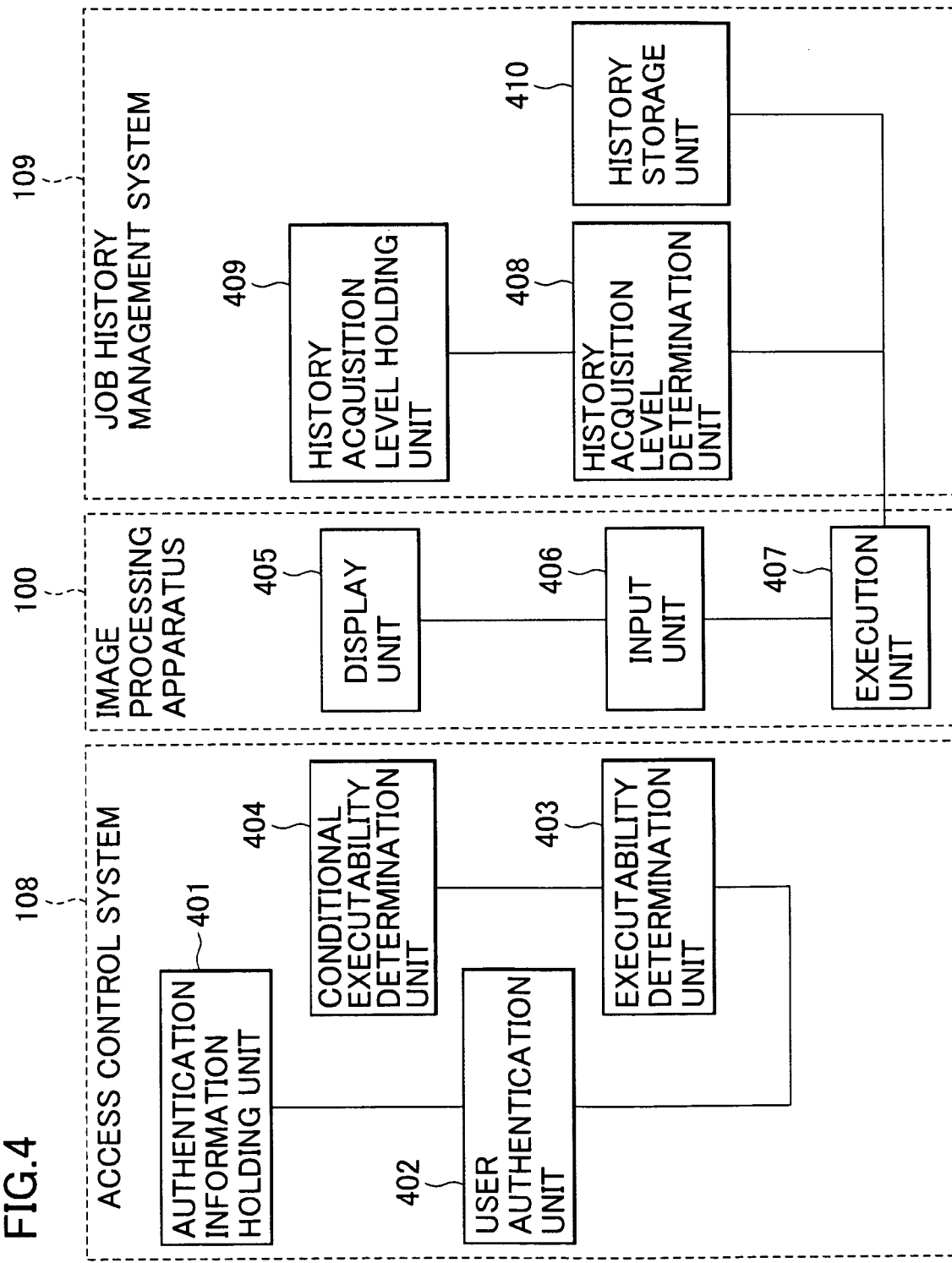
FIG. 4 is a functional block diagram of the image processing system.

The service provider 101 is a main component of a job history management system (job history management apparatus) shown at 109 in FIG. 4, and the security agent 103 is a main component of an access control system (access control apparatus) shown at 108 in FIG. 4.

The image processing apparatus 100 transmits, to the service provider 101, history information 107 on a job such as copying, facsimile transmission, scanning, and printing and on a user giving an instruction to execute the job. The service provider 101 stores the history information 107 into the data server 102.

The security agent 103 is a server for issuing authority information on each user, as access limiting information 106. The directory server 104 is a database for collectively managing user information and printer information.

The security agent 103 acquires information on each user from the directory server 104. The image processing apparatus 100 limits usable functions in accordance with the access limiting information 106 generated by the security agent 103.

Figure 2:
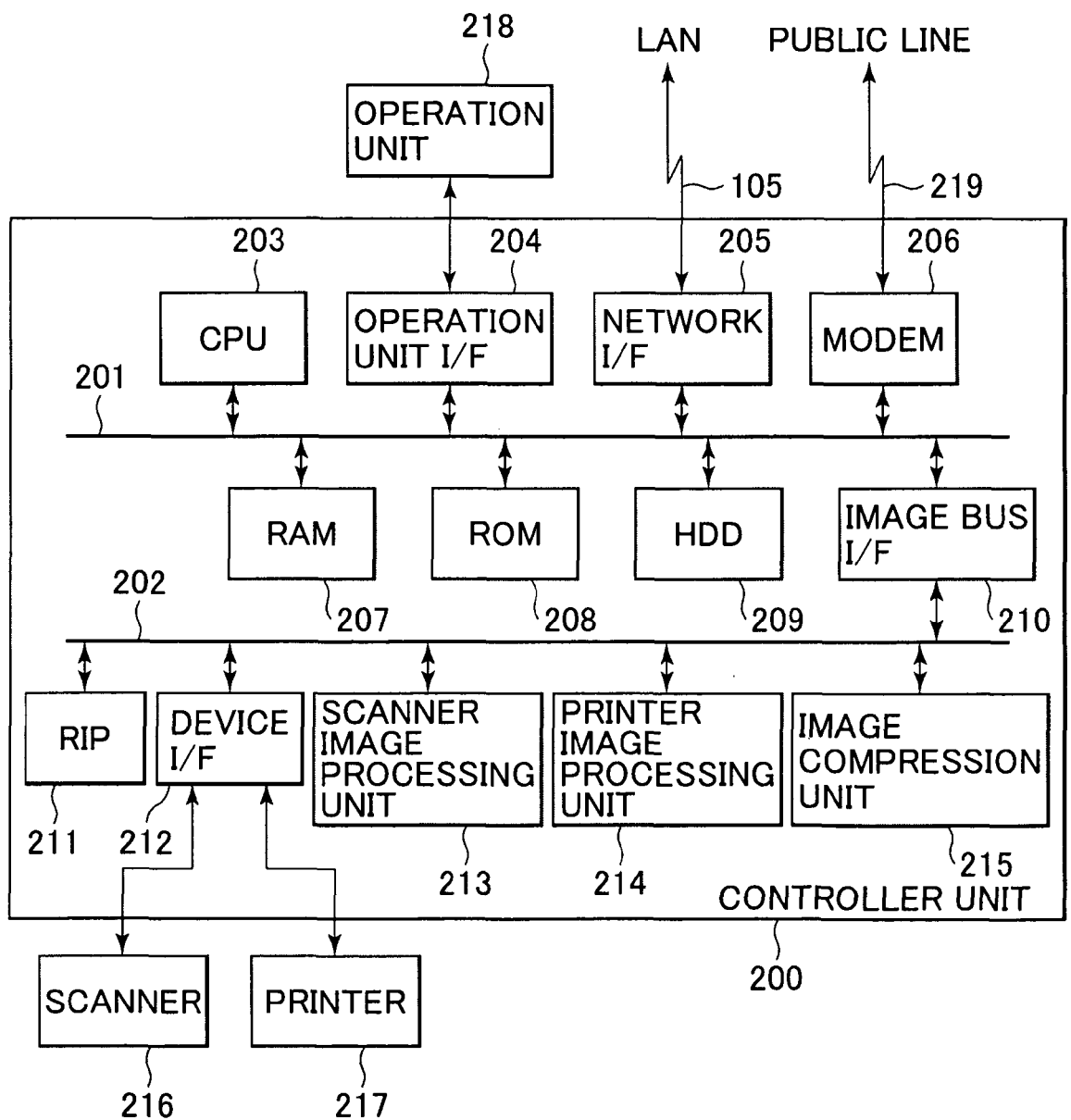
FIG. 2 is a block diagram showing a controller unit of an image processing apparatus in FIG. 1.

FIG. 2 shows in block diagram a controller unit of the image processing apparatus 100.

As shown in FIG. 2, a controller unit 200 is connected to a scanner 216 as an image input device, a printer 217 as an image output device, a LAN 105, and a public line 219. The controller unit 200 controls input and output of image information and device information.

The controller unit 200 includes a CPU 203 for controlling the entire image processing apparatus. An operation unit I/F 204 is an interface with an operation unit 218, outputs to the operation unit 218 image data to be displayed thereon, and transmits to the CPU 203 information input by a user via the operation unit 218.

A network I/F 205 is connected to the LAN 105 for input and output of information. A modem 206 connected to the public line 219 performs modulation/demodulation for transmitting and receiving data.

A RAM 207 is a system work memory used by the CPU 203 for its operation and used as an image memory for temporal storage of image data. A ROM 208 is utilized as a boot ROM storing a boot program for the image processing apparatus.

An HDD (hard disk drive) 209 stores system software, image data, etc. In some cases, the HDD 209 stores information on image output speed, an installation position, etc. of a node connected to the network (LAN 105). The above described devices are on a system bus 201.

An image bus I/F 210 is connected to the system bus 201 and to an image bus 202 that transfers image data at high speed. The image bus I/F 210 functions as a bus bridge for converting data structure.

The image bus 202 is implemented by a high-speed bus such as a PCI bus or IEEE 1394. The following devices are on the image bus 202.

A raster image processor (RIP) 211 decompresses PDL codes into bitmap data. A device I/F 212 connects the controller unit 200 with the scanner 216 and the printer 217, which are image input and output devices.

A scanner image processing unit 213 performs correction, modification, and editing on input image data. A printer image processing unit 214 performs printer correction, resolution conversion, etc. on print output image data. An image compression unit 215 carries out JPEG compression/decompression processing on multi-valued image data and JBIG, MMR, or MH compression/decompression processing on binary image data.

Figure 3:
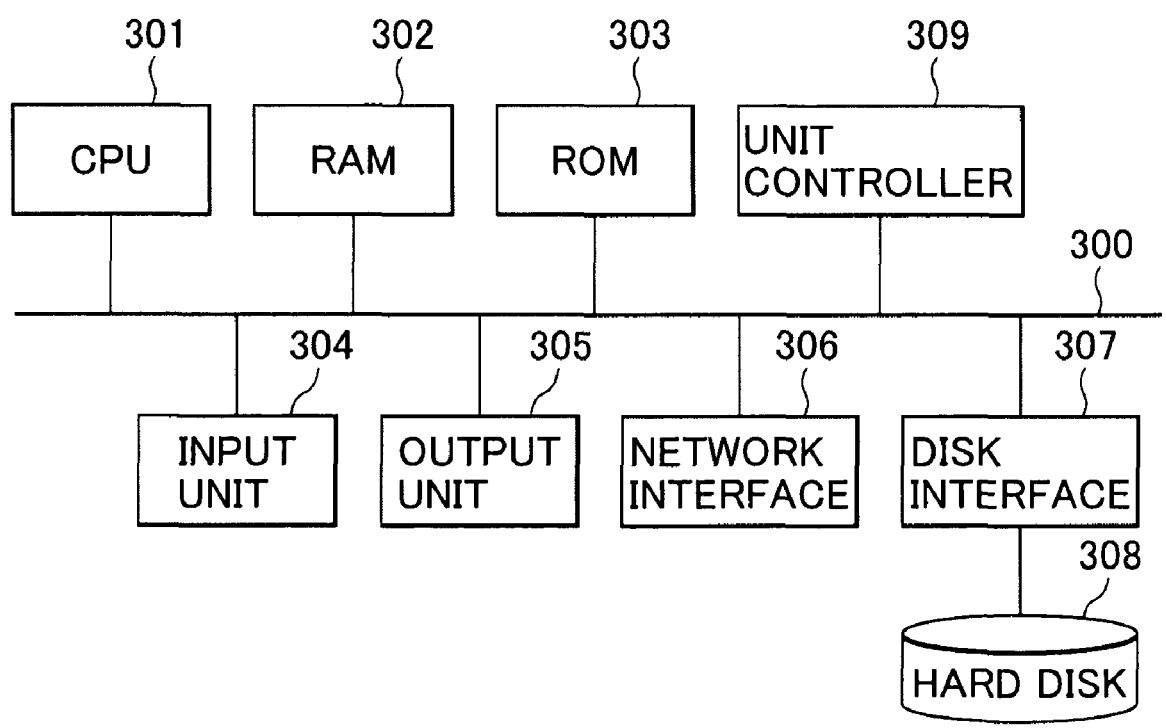
FIG. 3 is a view showing an example hardware construction of a service provider, a data server, a security agent, and a directory server, which are shown in FIG. 1.

FIG. 3 shows in block diagram an example hardware construction of the service provider 101, the data server 102, the security agent 103, and the directory server 104, which are shown in FIG. 1. They are each implemented by a general purpose PC and can be represented by the same block diagram.

Each of the apparatuses 101 to 104 includes a bus 300, to which the following devices are connected as described below with reference to FIG. 3.

A CPU 301 performs various control and computation. A RAM 302 is a volatile memory in which results of computation by the CPU 301, etc. are stored. The RAM 302 is also utilized for a storage device into which a program that realizes the invention is loaded.

A ROM 303 is a non-volatile memory and stores a program for operating the CPU 301, font data, etc. The ROM 303 may be of a rewritable type. The program for operating the CPU 301 may be stored in the RAM 302.

The CPU 301 supplies instructions, etc. to an input unit 304, an output unit 305, a network interface 306, a disk interface 307, and a unit controller 309. The CPU 301 stores into the RAM 302 results of processing, results of input, and other temporarily-needed information.

The input unit 304 receives input data, etc., which are transferred between the devices. The output unit 305 displays information, where necessary. The network interface 306 establishes connection with an external network such as LAN. The disk interface 307 is connected to a hard disk 308.

The hard disk 308 stores data, programs, etc. The data, etc. stored therein are utilized by being read out, where required, to the RAM 302 in accordance with an instruction supplied from the CPU 301. A plurality of hard disks 308 may be provided.

FIG. 4 shows in block diagram the functions of the image processing system.

As shown in FIG. 4, an access control system (access control apparatus) 108 includes an authentication information holding unit 401, a user authentication unit 402, an executability determination unit 403, and a conditional executability determination unit 404.

The authentication information holding unit 401 corresponding to the hard disk 308 of the directory server 104 holds user names, passwords, posts, authority information, etc. by means of a directory server that manages Windows (registered trademark) domain user/group information.

The user authentication unit 402 corresponding to the CPU 301 of the security agent 103 compares a login user with data in the authentication information holding unit 401, and generates access limiting information 106.

The executability determination unit 403 corresponding to the CPU 301 of the security agent 103 determines based on the access limiting information 106 whether or not a function which the user wishes to execute is executable.

The conditional executability determination unit 404 also corresponds to the CPU 301 of the security agent 103, and determines based on the access limiting information 106 whether or not a job determined by the executability determination unit 403 to be unexecutable can be conditionally executed.

The image processing apparatus 100 includes a display unit 405, an input unit 406, and an execution unit 407.

The display unit 405 corresponds to the operation unit 218, and displays an input screen and a "function unexecutable" message to the user. The input unit 406 also corresponds to the operation unit 218, and accepts via the input unit 406 a user's manipulation instruction and user's input for accepting or rejecting a job execution enabling condition.

In accordance with the instruction received by the input unit 406, the execution unit 407 carries out a process instructed by the user. The execution unit 407 corresponds to the scanner 216 and the printer 217.

A job history management system (job history management apparatus) 109 includes a history acquisition level determination unit 408, a history acquisition level holding unit 409, and a history storage unit 410.

The history acquisition level determination unit 408 corresponds to the CPU 301 of the service provider 101. With respect to a process about to be executed by the execution unit 407, the history acquisition level determination unit 408 makes an inquiry to the history acquisition level holding unit 409 about whether or not a history of the process should be acquired, and if so, about to what level the history should be acquired. Then, the level determination unit 408 waits for response of the level holding unit 409.

The history acquisition level holding unit 409 corresponds to the RAM 302 or the hard disk 308 of the service provider 101. The execution unit 407 stores the history determined by the history acquisition level determination unit 408 into the history storage unit 410. The history storage unit 410 corresponds to the hard disk 308 of the data server 102.

In this embodiment, history acquisition level information is held in the history acquisition level holding unit 409 of the service provider 101. However, the history acquisition level information may be indicated in the access limiting information 106 or may be held in the RAM 207 or the HDD 209 of the image processing apparatus 100.

Figure 5A:
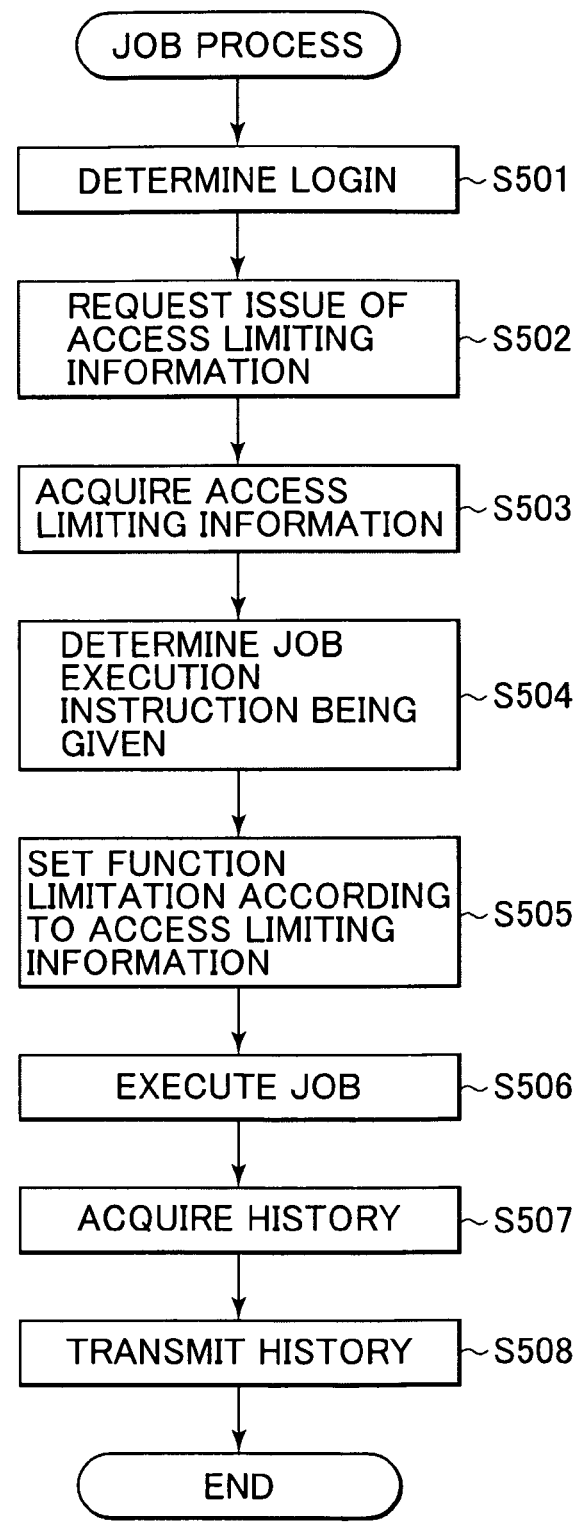
FIGS. 5A to 5C are flowcharts showing the procedures of ordinary job processes executed by respective ones of the image processing apparatus, an access control system, and a job history management system in FIG. 4.
Figure 5B:
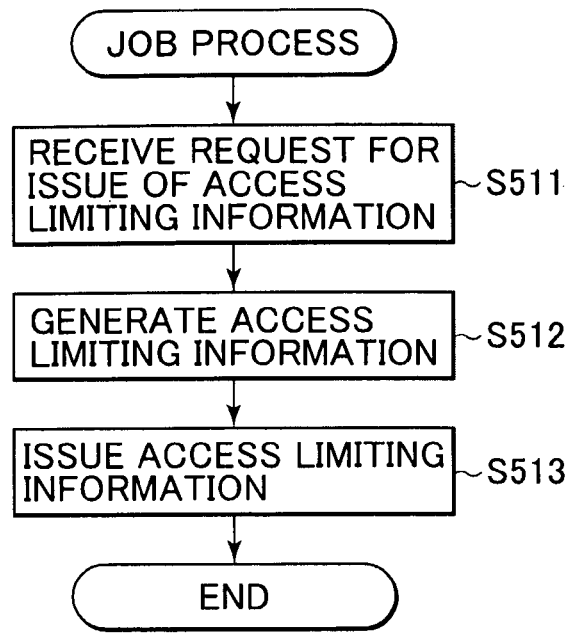
Figure 5C:
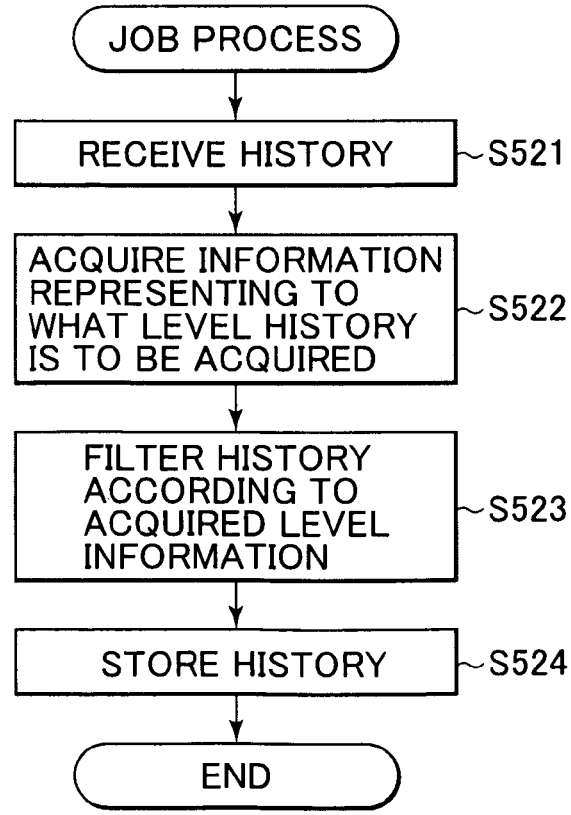

FIGS. 5A to 5C show in flowchart the procedures of ordinary job processes, which are respectively implemented by the image processing apparatus 100, the access control system 108, and the job history management system 109.

As shown in FIG. 5A, when determining that a user logs in the image processing apparatus 100 (step S501), the image processing apparatus 100 requests the security agent 103 to issue access limiting information 106 on the login user (step S502), and acquires the access limiting information 106 issued by the security agent 103 (step S503).

When determining that a job execution instruction is given by the user (step S504), function limitation is set in accordance with the acquired access limiting information 106 (step S505), and a job is executed (step S506). Next, a history of the executed job is acquired (step S507), and the acquired history is transmitted to the service provider 101 (step S508), whereupon the process is finished.

As shown in FIG. 5B, the security agent 103 of the access control system 108 receives from the image processing apparatus 100 a request for issuing access limiting information (step S511), acquires authority information (permission information) on the user from the directory server 104, and generates access limiting information 106 (step S512). The generated access limiting information 106 is transmitted to the image processing apparatus 100 (step S513), and the process is finished.

As shown in FIG. 5C, the service provider 101 of the job history management system 109 receives the job history information from the image processing apparatus 100 (step S521), acquires from the HDD 308 or the RAM 302 of the service provider 101 or from the image processing apparatus 100 acquisition level information representing to what level the history is to be acquired (step S522), and extracts (filters) the required history information from the received job history information in accordance with the acquired level information (step S523).

The extracted history information is transferred to and stored into the HDD 308 of the service provider 101 or the data server 102 (step S524), and the process is finished.

In the above example, the service provider 101 acquires the history information and the acquisition level information, extracts the required history information from the acquired history information according to the acquisition level information, and stores the required history information into the service provider 101 or the data server 102. However, only the required history information may be transmitted from the image processing apparatus 100 to the service provider 101, or may be stored into the data server 102.

Figure 6B:
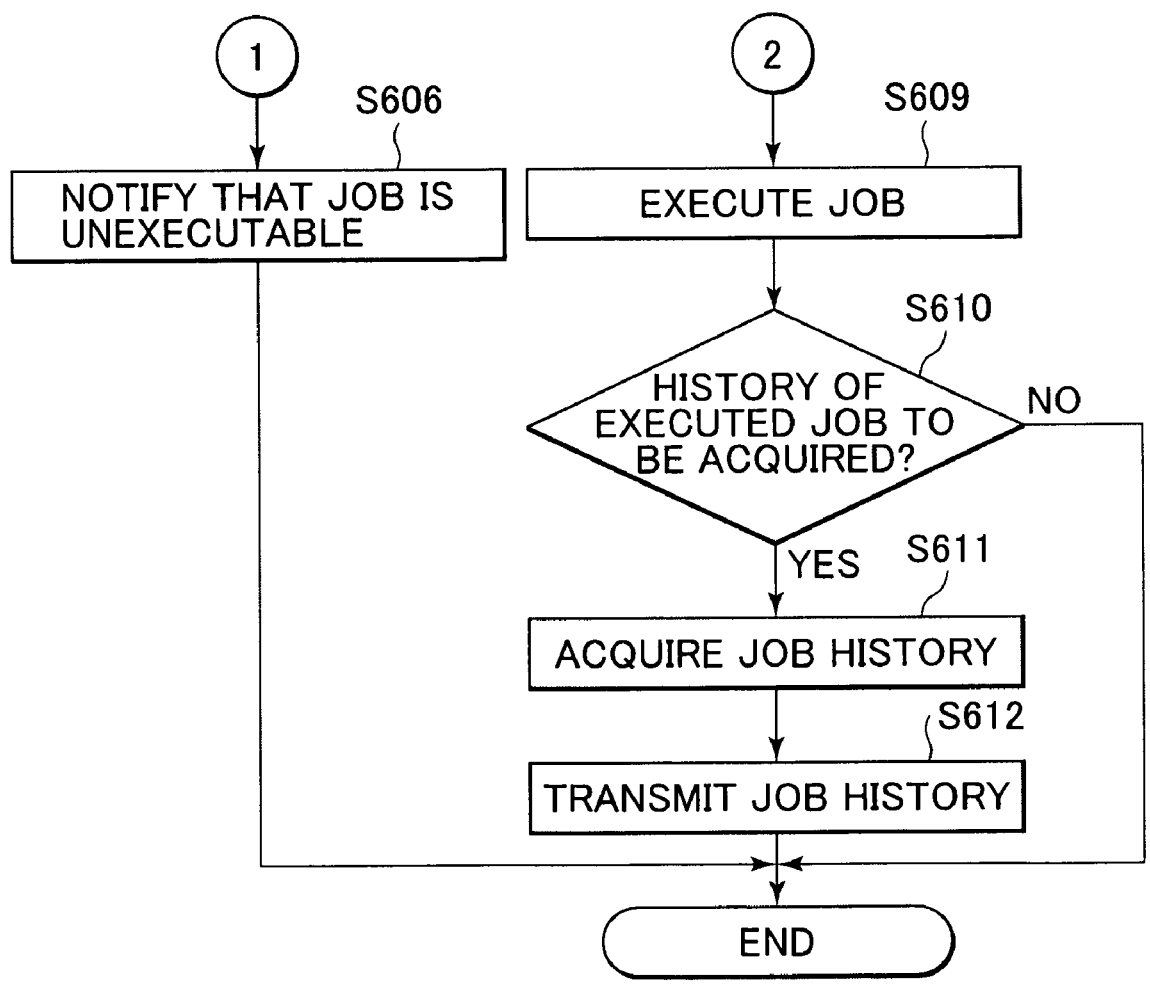

FIGS. 6A and 6B show in flowchart a first example of the procedure of a limited job process carried out by the image processing system shown in FIG. 4.

When determining that a user logs in the image processing apparatus 100 (step S601), the image processing apparatus 100 acquires access limiting information 106 on the login user (step S602). The step S602 realizes the function of an acquisition unit for acquiring access limiting information 106 in response to the image processing apparatus being logged. Next, a job execution instruction given by the user via the input unit 406 is determined (step S603).

With reference to the access limiting information 106 generated by the user authentication unit 402, the executability determination unit 403 determines whether or not the job which the user wishes to execute is executable (step S604). The step S604 realizes the function of a first determination unit that determines, in response to an execution instruction being given, whether or not a job is executable with reference to the access limiting information 106 acquired by the acquisition unit.

If it is determined that the job is executable (YES to step S604), the job is executed (step S609). Next, if it is determined that a history of the executed job is to be acquired (YES to step S610), the history is acquired (step S611). On the other hand, if the history acquisition is unnecessary (NO to step S610), the process is completed immediately.

If it is determined that the job is not executable (NO to step S604), the conditional executability determination unit 404 determines whether or not the job is executable on condition that the job history is acquired with reference to the access limiting information 106 (step S605). The step S605 realizes the function of a second acquisition unit that acquires the job history when it is determined by the first determination unit that the job is not executable, and functions as a second determination unit that determines whether or not the job is executable with reference to the job history acquired by the second acquisition unit.

If the job history acquisition is not a job execution enabling condition (i.e., if it is determined that the job is not executable even with the job history acquisition) (NO to step S605), the display unit 405 notifies (displays to) the user that the job is unexecutable (step S606), and the process is finished.

If it is determined that the job is executable with the job history acquisition (YES to step S605), the display unit 405 notifies (displays to) the user that the job is executable with the job history acquisition, and displays a screen to select acceptance or rejection of job history acquisition (step S607).

The steps S606 and S607 realize the function of a display unit which displays that the second determination unit has determined that the job is executable or has determined that the job is unexecutable.

If it is determined that the user selects the job execution with job history acquisition on the selection screen via the input unit 406 (YES to step S608), the job is executed (step S609). In this case, the answer to step S610 becomes YES, and therefore the job history is acquired (step S611). The acquired job history is transmitted to the service provider 101 (step S612), and the process is finished.

The step S609 realizes the function of an execution unit for executing the job when it is determined by the first or second determination unit that the job is executable. The step S611 realizes the function of a third acquisition unit (transmission unit) for acquiring the history of the job executed by the execution unit.

As for the limited job process in FIGS. 6A and 6B, it is assumed that the level to which the job history is to be acquired is set in the job history management system 109. With the limited job process, even a job whose execution is limited by the access control system 108 can be executed on condition that a job execution history is stored into the job history management system 109. As a result, it is possible for the job history management system 109 and the access control system 108 to cooperate to achieve highly flexible provision of a function to the user, without lowering the security level.

Figure 7A:
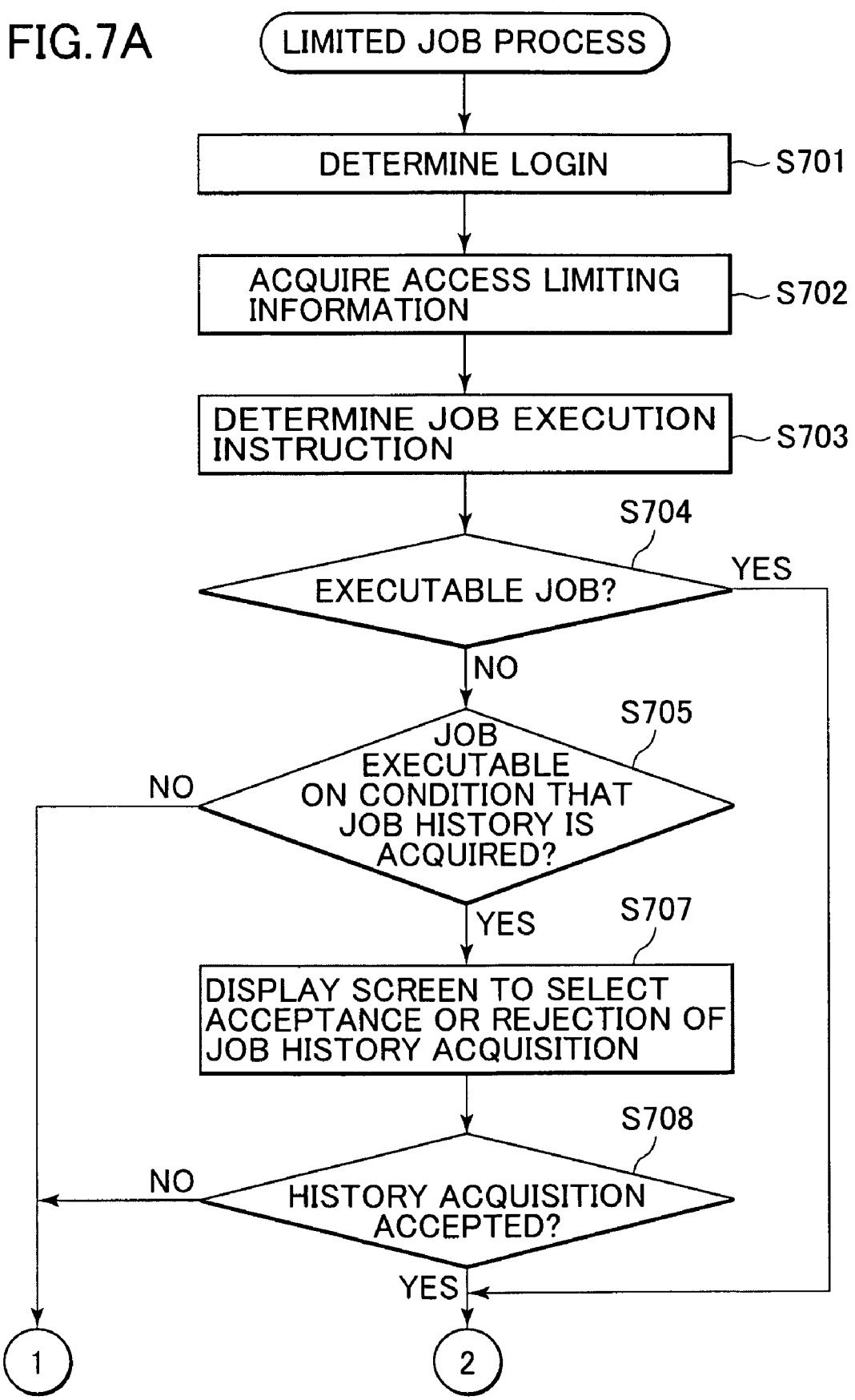
FIGS. 7A and 7B are a flowchart showing a second example of the procedure of a limited job process carried out by the image processing system.
Figure 7B:
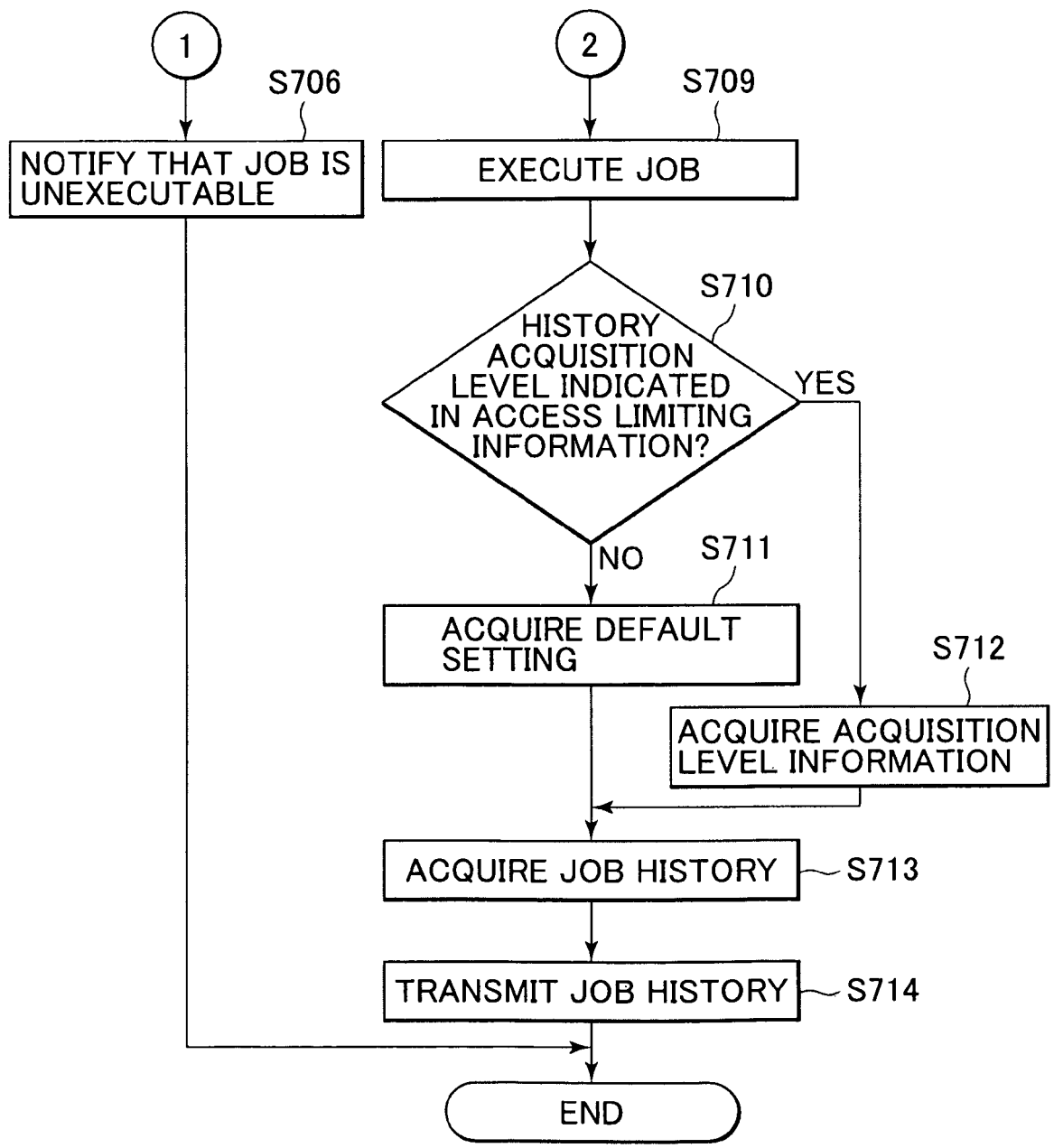

FIGS. 7A and 7B show in flowchart a second example of the procedure of a limited job process implemented by the image processing system shown in FIG. 4.

Specifically, the limited job process shown in FIGS. 7A and 7B is carried out in a case that access limiting information 106 includes the indication of a level of job history acquisition for execution of limited job.

As shown in FIGS. 7A and 7B, when determining that a user logs in the image processing apparatus 100 (step S701), the image processing apparatus 100 acquires access limiting information 106 on the login user (step S702), and determines a job execution instruction given by the user via the input unit 406 (step S703).

With reference to the access limiting information 106 generated by the user authentication unit 402, the executability determination unit 403 determines whether or not the job which the user wishes to execute is executable (step S704).

If it is determined that the job is executable (YES to step S704), the job is executed (step S709). In a case where a history acquisition level is not indicated in the access limiting information 106 (NO to step S710), a default setting is acquired (step S711). Then, the job history is acquired (step S713), the acquired history is transmitted to the service provider 101 (step S714), and the process is completed.

In a case where the history acquisition level is indicated in the access limiting information 106 (YES to step S710), acquisition level information is acquired (step S712). Among plural types of history information contained in the job history, the acquisition level information represents types of minimal history information to be acquired as an access limit releasing condition. The types of minimal history information include, for example, "ID of user executing the job", "date and time of execution of job" and "image data used in the job".

The step S710 realizes the function of a third determination unit for determining, after execution of the job by the execution unit, whether or not a job history acquisition level is set in the access limiting information 106. The step S711 realizes the function of a fourth acquisition unit for acquiring the default setting in a case where it is determined by the determination unit that the job history acquisition level is not set. The step S712 realizes the function of a fifth acquisition unit for acquiring the acquisition level in a case where it is determined by the third determination unit that the job history acquisition level is set.

Next, in accordance with the level information acquired in step S712, history information is acquired (step S713), and the acquired history information is transmitted to the service provider 101 (step S714), whereupon the process is completed.

If it is determined that the job is not executable (NO to step S704), the conditional executability determination unit 404 determines whether or not the job is executable on condition that the job history is acquired with reference to the access limiting information 106 (step S705). If the job history acquisition is not a job execution enabling condition (i.e., if it is determined that the job is not executable even with the job history acquisition) (NO to step S705), the display unit 405 notifies (displays to) the user that the job is unexecutable (step S706), and the process is finished.

If it is determined that the job is executable with the job history acquisition (YES to step S705), the display unit 405 notifies (displays to) the user that the job is executable with the job history acquisition, and displays a screen to select acceptance or rejection of job history acquisition (step S707). If it is determined that the user selects the job execution with job history acquisition on the selection screen via the input unit 406 (YES to step S708), the job is executed (step S709). Then, the above described processing in step S710 and the subsequent steps is carried out.

The default setting is set in a setting unit, not shown, which may be provided in either the image processing apparatus 100 or the service provider 101.

Figure 8B:
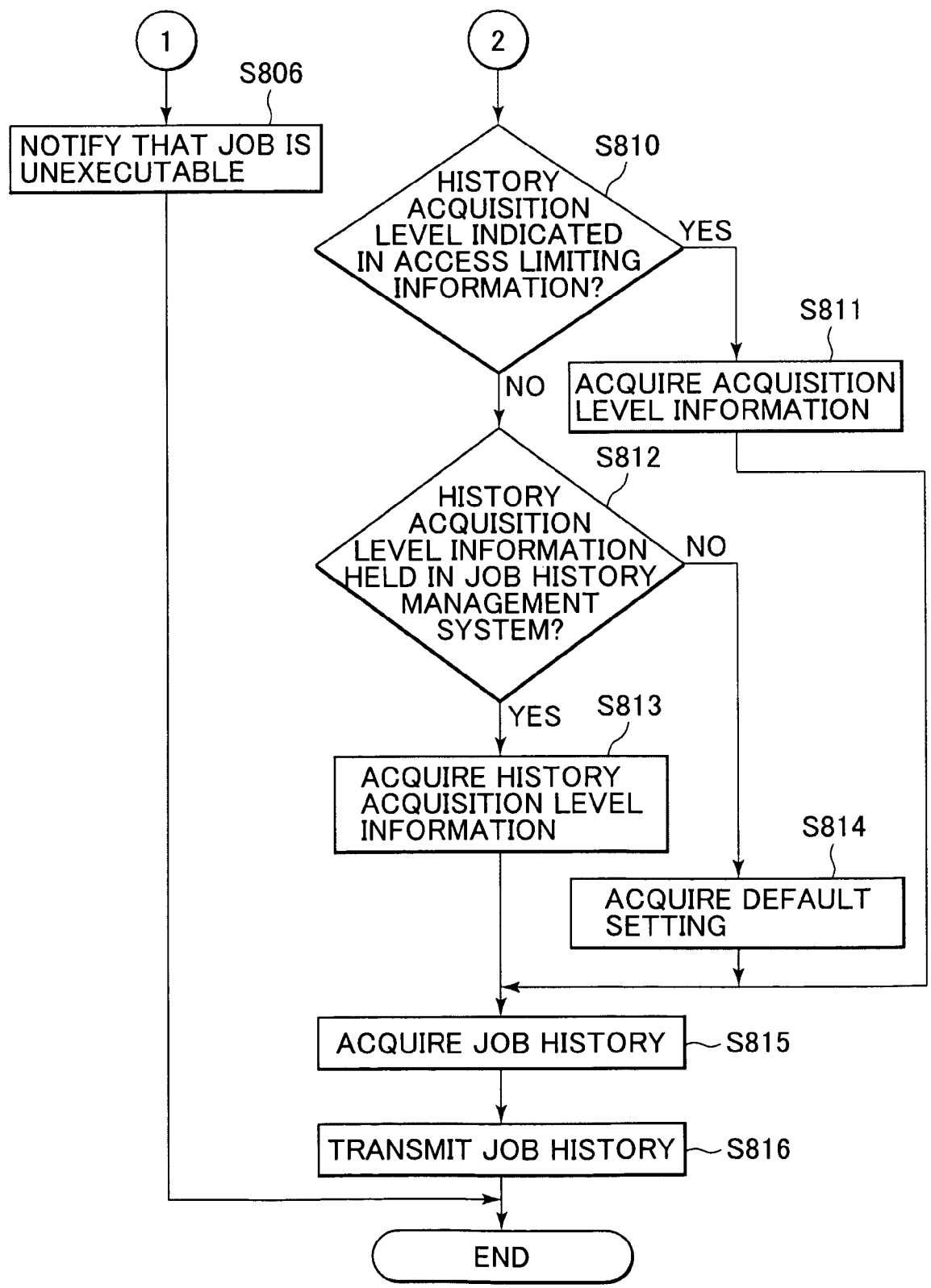

FIGS. 8A and 8B show in flowchart a third example of the procedure of a limited job process implemented by the image processing system in FIG. 4.

Specifically, the limited job process shown in FIGS. 8A and 8B is carried out in a case where the access limiting information 106 includes the indication of a level of job history acquisition for execution of limited job, or history acquisition level information is held in the job history management system 109.

As shown in FIGS. 8A and 8B, when determining that a user logs in the image processing apparatus 100 (step S801), the image processing apparatus 100 acquires access limiting information 106 on the login user (step S802), and determines a job execution instruction given by the user via the input unit 406 (step S803).

With reference to the access limiting information 106 generated by the user authentication unit 402, the executability determination unit 403 determines whether or not the job which the user wishes to execute is executable (step S804).

If it is determined that the job is executable (YES to step S804), the job is executed (step S809). In a case where a history acquisition level is indicated in the access limiting information 106 (YES to step S810), acquisition level information is acquired from the access limiting information 106 (step S811).

If a history acquisition level is not indicated in the access limiting information 106 (NO to step S810), it is determined whether or not history acquisition level information is held in the job history management system 109 (step S812). If the level information is held in the system 109 (YES to step S812), the level information is acquired therefrom (step S813).

The step S812 realizes the function of a fourth determination unit for determining whether or not a job history acquisition level is set in the job history management system 109 in a case where the third determination unit determines that the acquisition level is not set in the access limiting information 106.

If the level information is not held in the management system 109 (NO to step S812), a default setting is acquired from the image processing apparatus 100 or the service provider 101 (step S814). Next, in accordance with the level information acquired from the access limiting information 106 or from the job history management system 109, history information is acquired (step S815), and the acquired history information is transmitted to the service provider 101 (step S816), whereupon the process is completed.

If it is determined that the job is not executable (NO to step S804), the conditional executability determination unit 404 determines whether or not the job is executable on condition that the job history is acquired with reference to the access limiting information 106 (step S805). If the job history acquisition is not a job execution enabling condition (i.e., if it is determined that the job is not executable even with the job history acquisition) (NO to step S805), the display unit 405 notifies (displays to) the user that the job is unexecutable (step S806), and the process is finished.

If it is determined that the job is executable with the job history acquisition (YES to step S805), the display unit 405 notifies (displays to) the user that the job is executable with the job history acquisition, and displays a screen to select acceptance or rejection of job history acquisition (step S807).

If it is determined that the user selects the job execution with job history acquisition on the selection screen via the input unit 406 (YES to step S808), the job is executed (step S809). Then, the processing in step S810 and the subsequent steps is carried out.

If it is determined that the user does not select the job execution with job history acquisition via the input unit 406 (NO to step S808), a notification that the job cannot be executed is displayed on the display unit 405 (step S806).

In this embodiment, whether or not a history acquisition level is indicated in the access limiting information 106 is determined before determining whether the acquisition level is set in the job history management system 109. However, whether or not the acquisition level is set in the system 109 may first be determined.

With the limited job process shown in each of FIGS. 7 and 8, a job history (log) is acquired according to a history acquisition level, and therefore the required logs can be acquired without the need of acquiring all the logs. It is also possible to acquire all the logs and transmit the same to the service provider 101 (job history management system 109) and then extract the required logs by the management system 109. It is also possible to extract the required logs and then transmit the same to the service provider 101. Thus, a flexible system can be constructed.

FIG. 9 shows a first example of access limiting information 106 generated by the user authentication unit 402 in FIG. 4.

The access limiting information 106 is written in an XML format in the first example, but can be written in any format. As shown in FIG. 9, the access limiting information 106 includes an element of <Attribute> and its attributes of <ApplicationCategory>, which indicate permission for job execution, prohibition of job execution, and permission for conditional job execution. Specifically, print category and copy category are permitted, and send category is not permitted.

FIG. 10 is a second example of access limiting information 106 generated by the user authentication unit 402.

The access limiting information 106 is written in an XML format in the second example, but can be written in any format. As shown in FIG. 10, the access limiting information 106 includes an element of <Attribute> and its attributes of <ApplicationCategory>, which indicate permission for job execution, prohibition of job execution, and permission for conditional job execution. Specifically, print category is permitted, copy category is conditionally permitted, and send category is not permitted. In the element of <Attribute> and its attribute of <LimitedCondition>, a requirement for a conditionally permitted category is indicated. Specifically, the term "GetLog" indicates that job history acquisition is required to execute a conditionally permitted category. In other words, the job history acquisition is set as a condition under which the execution of a prohibited job is enabled.

A history acquisition level is not indicated in the access limiting information 106 in the second example shown in FIG. 10. Thus, upon job history acquisition, a job history is acquired in accordance with a default setting or a history acquisition level set in the job history management system 109.

FIG. 11 shows a third example of access limiting information 106 generated by the user authentication unit 402.

The access limiting information 106 is written in an XML format in the third example, but can be written in any format. In addition to information indicated in the access limiting information 106 shown in FIG. 10, the access limiting information 106 in FIG. 11 includes an element of <LogInfo> which indicates information on history items to be acquired by default and history items to be acquired upon execution of a conditionally permitted category job.

To execute a conditionally permitted category job, acquisition of histories of section ID, job start time, job end time, device ID, and number of pages is required, in addition to acquisition of items indicated in child elements and item elements of a default element.

FIG. 12 shows a first example of a history acquired by the image processing system in FIG. 4.

The acquired history is written in an XML format in the first example, but can be written in any format. In the history shown in FIG. 12, it is recorded that the type of job is copy. Log ID, user ID, and host machine ID are also recorded.

FIG. 13 is a second example of a history acquired by the image processing system.

The history shown in FIG. 13 is acquired when a conditionally permitted category job is executed in accordance with the access limiting information 106 shown in FIG. 11. In addition to the log (history) shown in FIG. 12, section ID, job start time, job end time, device ID, number of pages are recorded in the history.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium. In that case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-067880, filed Mar. 17, 2008, which is hereby incorporated by reference herein in its entirety.

What is claimed is:

1. An image processing apparatus capable of communicating with an access control apparatus that manages authority information on a function of the image processing apparatus on a per-user basis and with a job history management apparatus that manages a job history of the image processing apparatus, comprising:
   an acquisition unit adapted to acquire authority information on a user logging in the image processing apparatus;
   a determination unit adapted to determine with reference to the authority information acquired by said acquisition unit, in a case where the image processing apparatus receives a user's instruction to execute a job, whether the job is executable without a history of the job being transmitted to the job history management apparatus or the job is executable on condition that the history of the job is transmitted to the job history management apparatus or the job is not executable;
   an execution unit adapted to execute the job except for a case where said determination unit determines that the job is not executable; and
   a transmission unit adapted to acquire, in response to said determination unit determining that the job is executable on condition that the history of the job is transmitted to the job history management apparatus, the history of the job executed by said execution unit and to transmit the acquired history of the job to the job history management apparatus,
   wherein authority information to be acquired by said acquisition unit from said access control apparatus includes permission information representing a condition under which execution of a function limited by the authority information to be acquired is permitted.

2. The image processing apparatus according to claim 1, further including:
   a display unit adapted to display a result of determination by said determination unit that the job is executable or that the job is not executable.

3. The image processing apparatus according to claim 1, wherein the condition represented by the permission information is that the history of the job executed by said execution unit is to be transmitted to the job history management apparatus, and
   wherein said determination unit determines based on the permission information whether or not the job is executable.

4. The image processing apparatus according to claim 3, wherein the permission information specifies a type of information to be transmitted to the history management apparatus, among plural types of information contained in the history of the job executed by said execution unit.

5. The image processing apparatus according to claim 1, further including:
   an inquiry unit adapted to inquire, in a case where said determination unit determines that the job is executable under the condition represented by the permission information, the user performing an operation to instruct execution of the job about whether the job is to be executed according to the permission condition,
   wherein said execution unit executes the job when receiving a user's instruction that the job is to be executed according to the permission condition, and does not execute the job when not receiving the user's instruction that the job is to be executed according to the permission condition, the user's instruction being given from the user in response to the inquiry by said inquiry unit.

6. An image processing system including an image processing apparatus, an access control apparatus that manages authority information on a function of the image processing apparatus on a per-user basis, and a job history management apparatus that manages a job history of the image processing apparatus, comprising:
   an acquisition unit adapted to acquire authority information on a user logging in the image processing apparatus;
   a determination unit adapted to determine with reference to the authority information acquired by said acquisition unit, in a case where the image processing apparatus receives a user's instruction to execute a job, whether the job is executable without a history of the job being transmitted to the job history management apparatus or the job is executable on condition that the history of the job is transmitted to the job history management apparatus or the job is not executable;

an execution unit adapted to execute the job except for a case where said determination unit determines that the job is not executable; and a transmission unit adapted to acquire, in response to said determination unit determining that the job is executable on condition that the history of the job is transmitted to the job history management apparatus, the history of the job executed by said execution unit and to transmit the acquired history of the job to the job history management apparatus, wherein authority information to be acquired by said acquisition unit from said access control apparatus includes permission information representing a condition under which execution of a function limited by the authority information to be acquired is permitted.

7. A control method of an image processing apparatus capable of communicating with an access control apparatus that manages authority information on a function of the image processing apparatus on a per-user basis and with a job history management apparatus that manages a job history of the image processing apparatus, comprising:

an acquisition step of acquiring authority information on a user logging in the image processing apparatus;

a determination step of to determining with reference to the authority information acquired in said acquisition step, in a case where the image processing apparatus receives a user's instruction to execute a job, whether the job is executable without a history of the job being transmitted to the job history management apparatus or the job is executable on condition that the history of the job is transmitted to the job history management apparatus or the job is not executable;

an execution step of executing the job except for a case where it is determined in said determination step that the job is not executable; and a transmission step of acquiring, in response to said determination step determining that the job is executable on condition that the history of the job is transmitted to the job history management apparatus, the history of the job executed in said execution step and transmitting the acquired history of the job to the job history management apparatus, wherein authority information to be acquired in said acquisition step from said access control apparatus includes permission information representing a condition under which execution of a function limited by the authority information to be acquired is permitted.

* * * * *